July 11, 1944.                O. E. MILLER                2,353,485
                          WEEDER ATTACHMENT
              Filed Jan. 21, 1941            2 Sheets-Sheet 1
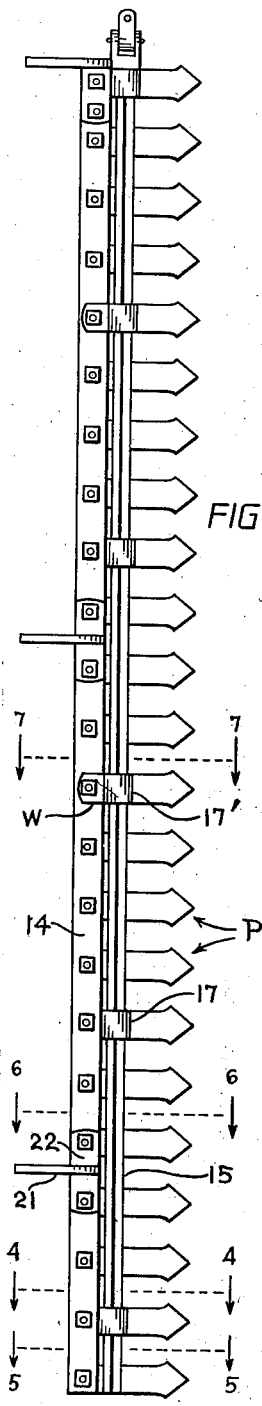
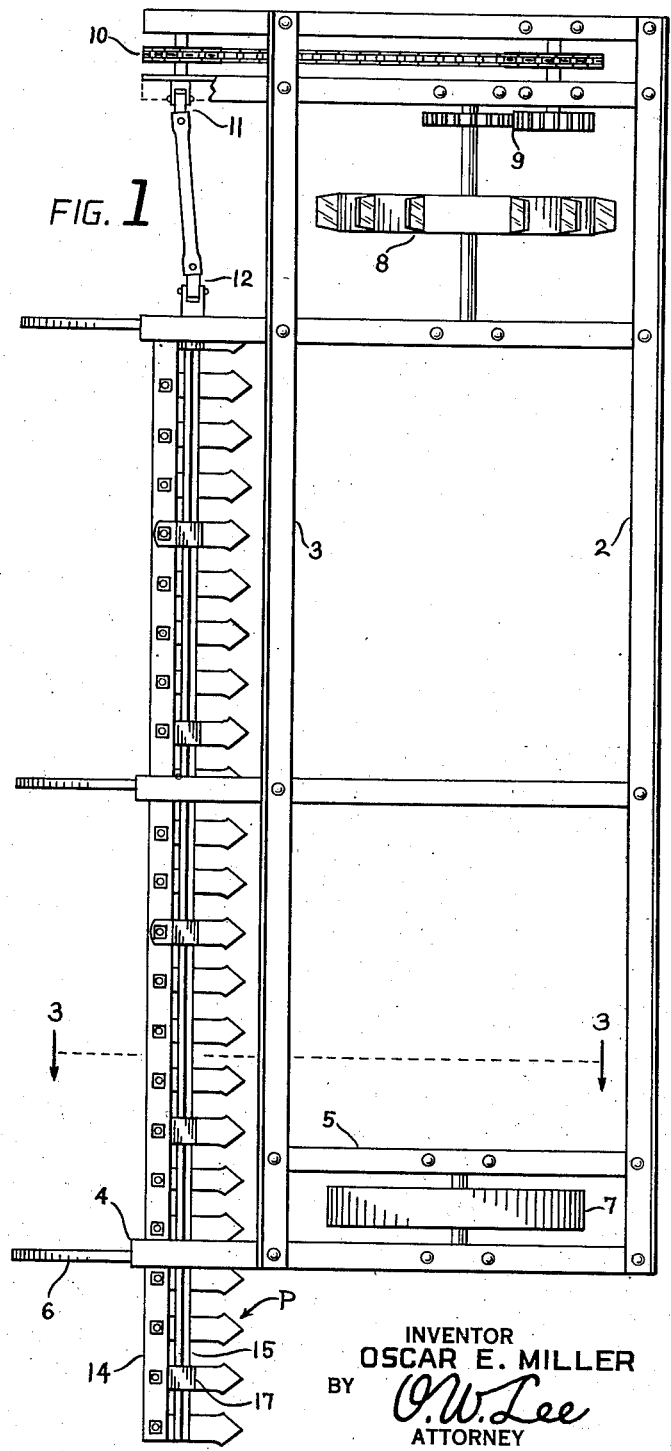
INVENTOR
OSCAR E. MILLER
BY O.W. Lee
ATTORNEY

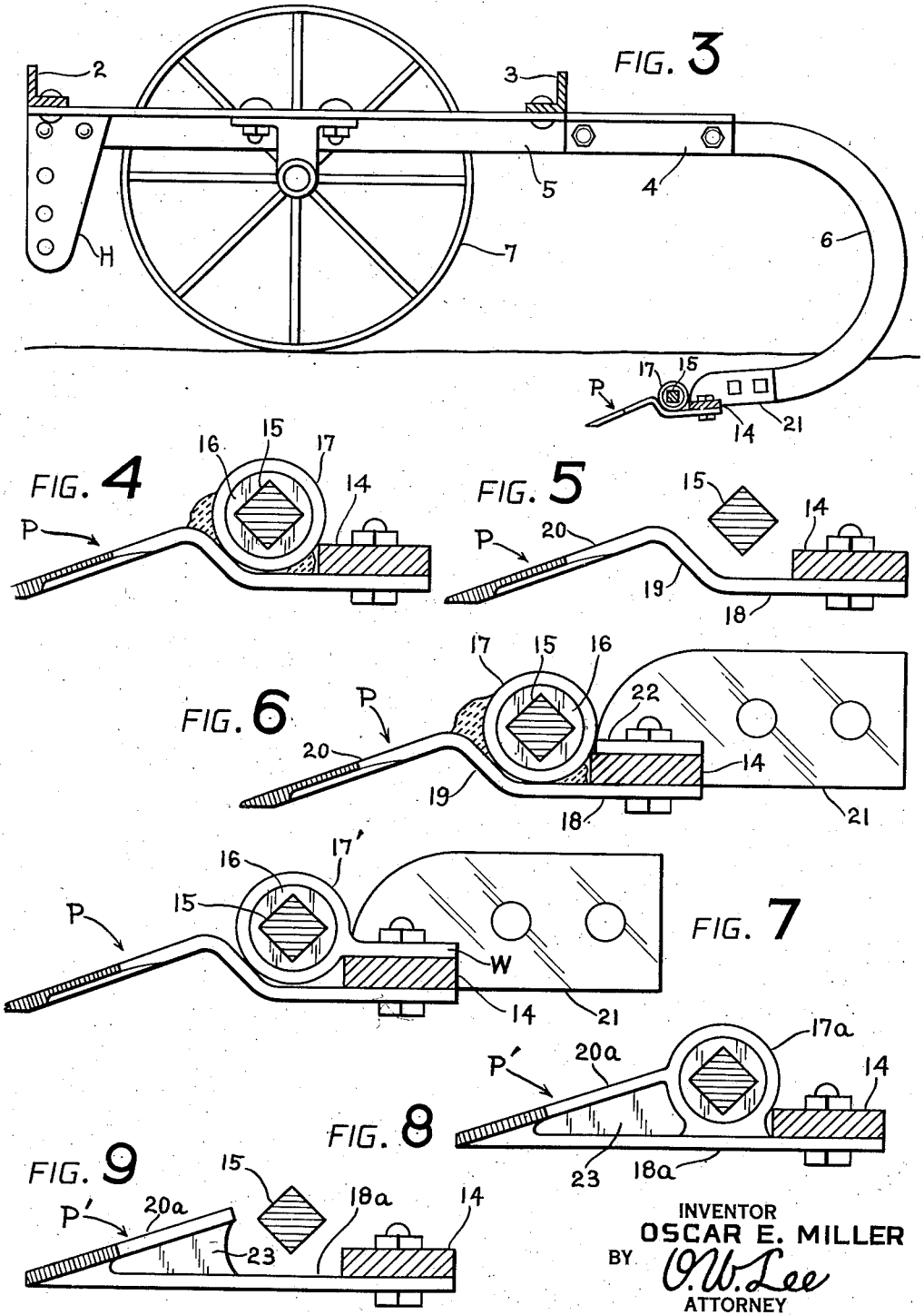

Patented July 11, 1944

2,353,485

UNITED STATES PATENT OFFICE 2,353,485

WEEDER ATTACHMENT

Oscar E. Miller, Stratton, Nebr., assignor to Cheney Weeder Company, Cheney, Wash., a corporation of Washington Application January 21, 1941, Serial No. 375,301

18 Claims. (Cl. 97—42)

The present invention relates to certain new and useful improvements in weeders of that type which employ a rotary rod, and is particularly directed to a series of closely spaced plow shovels arranged to cut the earth ahead of the rotary rod. These plow shovels are carried by a horizontal bar placed immediately behind the rotary rod and extending along the length of the latter, and this bar is mounted on the usual supporting standards which are ordinarily employed to carry the bearing shoes for the rotary rod. Thus there is provided a series of closely spaced plow shovels extending throughout the length of the rotary rod and cutting the earth between the usual supporting standards, without resorting to the use of additional supporting standards which would greatly interfere with the free passage of weeds and stubble, amid which such machines are usually operated.

These plow shovels readily enter the earth and cut the soil in advance of the rotary rod, so as to render the latter operatable in soil which is otherwise too hard for the rotary rod to enter. The rotary rod performs its usual purpose of uprooting weeds and breaking the soil into a lump mulch while constantly tumbling such material to the rear as the machine passes through the field, thus precluding such material from hindering the efficient operation of the machine.

This bar with its plow shovels can readily be mounted on any of the various rod weeders in general use, without resorting to any change in the frame structure or supporting standards, thus enabling the rotary rod to be operated in fields which would otherwise require preliminary breaking of the soil before the rotary rod could be satisfactorily operated.

These plow shovels have sufficient area to afford the necessary suck to hold the rotary rod in the soil under conditions which would otherwise cause the rotary rod to rise to the surface. The plow shovels are arranged to cut slightly below the depth at which the rotary rod is being operated, and the upper surface of the plow shovels has sufficient inclination to lift the soil and coarsely break it in advance of the rotary rod, so that the latter operates in the loosened soil and is relieved of the resistance which hard soil would otherwise present. Thus the invention greatly reduces the amount of draft power which would otherwise be required and also relieves the rotary rod of much of the stress to which it would otherwise be subjected. In this manner, the rotary rod is made operatable in hard ground where the rotary rod alone could not be operated.

Mounting the plow shovels on the described horizontal bar eliminates the need for additional standards, and enables the machine to operate in full stubble and large weeds which would otherwise clog a machine employing additional standards for supporting the plow shovels.

The drawings illustrate the invention and one example of the utilization of it.

Fig. 1 is a plan view of a well known type of weeder with the invention applied thereto.

Fig. 2 is an enlarged plan view of the invention separate from the machine.

Fig. 3 is an enlarged vertical section taken on the line 3—3 of Fig. 1.

Fig. 4 is an enlarged sectional detail taken on the line 4—4 of Fig. 2.

Fig. 5 is an enlarged sectional detail taken on the line 5—5 of Fig. 2.

Fig. 6 is an enlarged sectional detail taken on the line 6—6 of Fig. 2.

Fig. 7 is an enlarged sectional detail taken on the line 7—7 of Fig. 2.

Fig. 8 shows the plow shovel and journal bearing made as a casting.

Fig. 9 is the same as Fig. 5 except that the plow shovel is made as a casting.

Rod weeders were originally intended for the purpose of uprooting small weeds in recently tilled fields, but practice and experience has extended their use to the broader purpose of general tillage, soil conservation and moisture storage. This more extensive use puts such implements to extreme tasks which gives rise to the need and want for the present invention.

It is the general practice on large acerages to leave the stubble standing, from one season until the next, for the purpose of retaining moisture and to prevent wind erosion and also for whatever humus effect that may be derived from it, depending upon the nature of the vegetation. In the case of wheat, this stubble is usually full length straw and this together with the weeds and other tares, present a difficult obstacle for operation of a rotary rod weeder. Furthermore, at the end of the harvest time, the soil is usually too closely packed and hard for the rotary rod to penetrate the soil, and therefore resort must be had to preliminary tillage before the rotary rod can be operated in such fields. This additional working of the ground consumes time and expense which the present invention readily eliminates.

In carrying out my invention, I provide a horizontal bar 14 of the same length as the weeding rod 15. Attached to this bar 14 is a series of plow shovels such as P. These plow shovels may be of any suitable shape, but are preferably of the simplest form which will adequately serve the purpose. As best seen in Fig. 5, each shovel P has an inclined upper face 20 which merges into a shoulder portion 19 which is offset downward and merges into a shank 18 which is bolted crosswise of the horizontal bar 14. This type of shovel is preferable because it can be economically produced by drop forging. As here shown, the inclined upper face 20 rises well above the level of the upper face of the shank 18, and the forward end of this inclined working face extends below the level of the lower face of the shank 18. This affords a proper relationship for efficient operation.

As shown in Fig. 5 the inclined upper face 20 terminates at a spaced distance from the bar 14 so that there is provided a recess between this upper face 20, the shoulder 19, shank 18 and bar 14, within which recess the weeding rod 15 operates, suitable journal bearings such as 17 being provided at spaced distances along the bar 14, and the weeding rod having secured thereto a like number of bearing spools such as 16 for rotation in the bearings 17.

These journal bearings 17 may be welded to the shanks and shoulders of the plow shovels as illustrated in Fig. 4 and Fig. 6 or they may be separate as illustrated at 17' in Fig. 7 and each provided with a wing W for bolting to the bar 14 in the manner illustrated. This journal bearing 17' can also be bolted to the showing in Fig. 9 where the plow shovel P' is shown as a casting wherein the shank 18a extends straight forward and is joined to the inclined upper face 20a by a web 23. As shown in Fig. 8, the journal bearing 17a may be cast as a part of the plow shovel P'.

The plow shovels are spaced apart along the bar 14 and a suitable number of journal bearings are provided. Usually the bearings can be spaced about twice as many shovels apart as the illustrated spacing in Fig. 2 which is intended to show the possibility of close spacing when required for extremely difficult work.

The bar 14 is provided with the necessary number of brackets 21 for attaching to the earth engaging standards of the weeder frame. These brackets 21 may be merely a plate welded on edge to the upper side of the bar 14, but preferably they are provided with a base plate such as 22 for bolting to the bar 14 in the manner shown in Fig. 6.

In Fig. 1 and Fig. 3 the invention is shown applied to a weeder having a frame comprising a front rail 2 and rear rail 3 connected together by a number of cross rails such as 4 and 5, and is wheel supported as indicated at 7 and 8. Earth engaging standards such as 6 are bolted to the cross rails such as 4, there usually being three or four of such earth engaging standards depending upon the width of the machine. In the present instance, these standards are shown as the well known goose necks which are generally employed to carry the bearing shoes for the rotary rod.

According to my invention, the brackets 21 are bolted to the lower ends of these earth engaging standards and thus the bar 14 with the weeding rod 15 journaled in the bearings 17 and with the shovels P projecting in advance of the weeding rod, are all assembled as a unit upon the machine.

The weeding rod 15 may be driven in any suitable manner, either by a small engine on the frame of the machine, or by a power take-off from a tractor, but in the present instance there is illustrated the well known practice of driving the rod in reverse direction from the wheel 8 through the gears 9 and sprocket chain 10, suitable universal joints 11 and 12 being used to connect the weeding rod to the drive mechanism.

Such machines are often provided with one or two vertically adjustable castor wheels at the rear of the machine for the purpose of raising and lowering the weeding rod, but this well known expedient is not illustrated for the reason that it is well known that other means may be employed for the same purpose. It is also common practice to entirely omit all wheels of such machines and hingedly support the wheelless frame upon a lift device carried at the rear of a tractor, in which instance, the raising and lowering of the weeding rod is accomplished by the lift device of the tractor.

With the machine assembled as illustrated, paired hitch plates such as H are utilized for connecting the machine to any suitable draft power, and as the machine is pulled forwards the plow shovels will promptly cut into the soil and draw the weeding rod down until the maximum depth is reached. The plow shovels coarsely break the soil in advance of the rotary driven rod which then tumbles the soil to the rear, and at the same time uproots any weeds or other plants that have escaped between the plow shovels.

The prime purpose of the invention is for subsurface tillage rather than mere weeding, and when it is operated in stubble fields at the end of the harvest, it is preferably operated at sufficient depth to coarsely break the soil without actually uprooting the stubble and weeds. That is to say the stubble and weeds are left with their roots in the coarsely broken soil instead of attempting to uproot such growths and leave them lying flat on the ground. The roots being left in the cloddy mulch and the above ground stems being more or less erect, wind and water erosion are effectively prevented and any snow or rainfall will readily penetrate the soil instead of running off.

Since the invention requires no additional supporting standards other than those conventionally used on rotary rod weeders, the machine has the same clearance for stubble and weeds as would otherwise be afforded by the machine upon which it is mounted. This feature is of considerable advantage, because the use of additional supporting standards would greatly interfere with the free passage of such refuse and cause it to accumulate under the machine, even to the extent of raising the machine off the ground and rendering it inoperatable.

For the purpose of summer fallow, the invention can be utilized without previous preparation of the soil and will operate in soil which is too hard for the rotary rod alone to penetrate.

Where there is a matted turf which would present considerable obstacle to a rotary rod alone, the plow shovels of the present invention will effectively cut through such turf so that the rotary rod can operate efficiently.

In the usual rotary rod weeder, the number of bearings are limited to the number of supporting standards provided on the machine, and in difficult working conditions the resistance to the underground travel of the rotary rod will sometimes cause it to bow backwards to disadvantage. This distortion is readily overcome by the present invention by reason of the fact that the horizontal bar affords opportunity to employ additional bearings between the supporting standards, and the bearings can be spaced apart at whatever distance may be necessary to overcome the distorting of the rotary rod. Furthermore, the plow shovels cut the soil in advance of the rotary rod and thereby greatly reduce the resistance to underground travel of the rotary rod.

For the simple purpose of weeding, the invention will readily operate under conditions where a rotary rod alone could not function. As for instance where the field has been previously subjected to deep tillage which breaks up the soil in large lumps too big and too hard for the rotary rod to cut through, the plow shovels of the present invention will readily cut through these large lumps and render the operation of the rotary rod efficient.

The invention can readily be made to fit any rotary rod weeder in general use, and it can readily be installed and removed, in case interchangeable use is desired. The plow shovels and bearings are readily replaceable in case of damage or wear.

The present application is a continuation-in-part of my previous application Serial No. 300,180 filed Oct. 19, 1939, and Serial No. 311,447 filed Dec. 29, 1939.

In the present disclosure, I claim as my invention:

1. A weeder attachment comprising a horizontal bar, a series of plow shovels carried by said bar, a weeding rod rotatably mounted lengthwise of said bar and disposed between said bar and said plow shovels.

2. A weeder attachment comprising a horizontal bar, a plurality of spaced apart bearings carried by said bar, a weeding rod rotatably mounted in said bearings, a series of plow shovels attached to said bar and projecting forwardly of said weeding rod.

3. A weeder attachment comprising a flat horizontal bar, a series of plow shovels attached to said bar, each of said plow shovels having an upper face inclined with respect to said bar, a weeding rod rotatably mounted lengthwise of said bar and disposed between said bar and said plow shovels.

4. A weeder attachment comprising a flat horizontal bar, a series of plow shovels each having a shank disposed crosswise of said bar and secured on the underside thereof, each of said plow shovels having an upper face inclined with respect to said bar and terminating at a spaced distance from said bar and at a spaced distance above said shank so as to leave a recess between said bar and the several plow shovels and their shanks, a weeding rod rotatably mounted lengthwise of said bar and disposed within said recess.

5. A weeder attachment comprising a plow shovel having an upper working face inclined downwardly and terminating in a cutting edge, a shank extending rearwardly from said plow shovel, said shank being transversely horizontal for attachment crosswise of a horizontal bar, a journal bearing carried by said shank portion and disposed immediately behind the rear end of said working face, the axis of said journal bearing being transverse of said shank and parallel thereto so as to dispose the axis of said journal bearing lengthwise of any horizontal bar to which said shank is attached crosswise, said inclined working face being disposed entirely forward of said journal bearing, and said shank extending rearwardly of said journal bearing.

6. In a rotary rod weeder having a frame with earth engaging standards extending downwardly from the rear of the frame and a rotatably mounted weeding rod carried by said standards and means to rotate said weeding rod, a bar mounted on said standards and immediately behind said weeding rod, a series of plow shovels mounted on said bar and extending forwardly of said weeding rod to cut the earth in advance of the latter.

7. A rotary rod weeder comprising a frame, earth engaging standards extending downwardly from the rear of said frame, a horizontal bar mounted on the lower ends of said earth engaging standards, a weeding rod rotatably mounted immediately in front of said horizontal bar, a series of plow shovels carried by said horizontal bar and extending forwardly of said weeding rod to cut the earth in advance of said weeding rod and said horizontal bar, and drive means to rotate said weeding rod.

8. A rotary rod weeder comprising a frame, earth engaging standards extending downwardly from the rear of said frame, a horizontal bar mounted on the lower ends of said earth engaging standards, a number of journal bearings supported by said horizontal bar, a weeding rod rotatably mounted in said journal bearings, a series of plow shovels carried by said horizontal bar and extending forwardly of said weeding rod, and drive means to rotate said weeding rod.

9. A rotary rod weeder comprising a frame, earth engaging standards extending downwardly from the rear of said frame, a horizontal bar mounted on the lower ends of said earth engaging standards, a number of journal bearings supported by said horizontal bar, a weeding rod rotatably mounted in said journal bearings, and drive means to rotate said weeding rod.

10. A weeder attachment comprising a plow shovel embodying a flat piece of metal formed into a flat shank, a rising shoulder and an upper working face inclined with respect to said shank, said working face extending above and below the upper and lower faces of said shank, and the forward end of said inclined working face terminating in an enlarged cutting end so as to cut a width greater than the inclined working face immediately therebehind.

11. A weeder attachment comprising a plow shovel embodying a flat piece of metal formed into a flat shank, a rising shoulder and an upper working face inclined with respect to said shank, said working face extending above and below the upper and lower faces of said shank, and a journal bearing integral with the upper face of said shank and disposed immediately behind said shoulder, so that said inclined working face is entirely forward of said journal bearing, and said shank extending rearwardly of said journal bearing.

12. In a rotary rod weeder having a frame with earth engaging standards extending downwardly from the rear of said frame, a bar mounted on the lower ends of said standards, a weeding rod rotatably mounted immediately in front of said bar and parallel thereto, plow shovels carried by said bar and extending forwardly of said weeding rod, and means to rotate said weeding rod.

13. A weeder attachment comprising a flat horizontal bar, a series of plow shovels each having a shank disposed crosswise of said bar and secured on the underside thereof, each of said plow shovels having an upper face inclined with respect to said bar and terminating at a spaced distance from said bar and at a spaced distance above said shank so as to leave a recess between said bar and the several plow shovels and their shanks, certain of said shovels having journal bearings integral with the upper face of their shanks, and a weeding rod rotatably mounted in said bearings.

14. A weeder attachment comprising a flat horizontal bar, a series of plow shovels each having a shank attached to said bar, each of said plow shovels having an upper face inclined with respect to said bar, a horizontal weeding rod rotatably mounted along the edge of said bar and disposed between said bar and said plow shovels.

15. A weeder attachment comprising a horizontal bar, a series of plow shovels carried by said bar, and a weeding rod rotatably mounted lengthwise of said bar.

16. A weeder attachment comprising a horizontal bar, bearings spaced apart along said horizontal bar, and a weeding rod rotatably mounted in said bearings.

17. A weeder attachment comprising a flat horizontal bar, a series of plow shovels attached to said bar, each of said plow shovels having an upper face inclined with respect to said bar, and a weeding rod rotatably mounted lengthwise of said bar.

18. In a rotary rod weeder having a frame with earth engaging standards extending downwardly from the rear of said frame, a bar mounted on the lower ends of said standards, a weeding rod rotatably mounted lengthwise of said bar, and plow shovels carried by said bar and extending forwardly thereof.

OSCAR E. MILLER.